(12) United States Patent
Deker et al.

(10) Patent No.: US 10,621,875 B2
(45) Date of Patent: Apr. 14, 2020

(54) METHOD FOR AUTOMATICALLY RE-JOINING A ROUTE OF AN AIRCRAFT

(71) Applicant: THALES, Courbevoie (FR)

(72) Inventors: Guy Deker, Toulouse (FR); Michel Roger, Toulouse (FR); Vincent Savarit, Toulouse (FR)

(73) Assignee: THALES, Courbevoie (FR)

( * ) Notice: Subject to any disclaimer, the term of this patent is extended or adjusted under 35 U.S.C. 154(b) by 217 days.

(21) Appl. No.: 15/528,455

(22) PCT Filed: Dec. 28, 2015

(86) PCT No.: PCT/EP2015/081308
§ 371 (c)(1),
(2) Date: May 19, 2017

(87) PCT Pub. No.: WO2016/107853
PCT Pub. Date: Jul. 7, 2016

(65) Prior Publication Data
US 2019/0088143 A1 Mar. 21, 2019

(30) Foreign Application Priority Data
Dec. 30, 2014 (FR) .................................... 14 03023

(51) Int. Cl.
*G08G 5/00* (2006.01)
*G01C 23/00* (2006.01)
(Continued)

(52) U.S. Cl.
CPC ........... *G08G 5/0039* (2013.01); *G01C 21/20* (2013.01); *G01C 23/005* (2013.01); *G05D 1/101* (2013.01);
(Continued)

(58) Field of Classification Search
CPC .. G08G 5/0039; G08G 5/0021; G08G 5/0052; G05D 1/101; G01C 23/005; G01C 21/20; G01C 21/00
See application file for complete search history.

(56) References Cited

U.S. PATENT DOCUMENTS 6,163,744 A * 12/2000 Onken ................... G01C 23/00
340/979
9,846,039 B2 * 12/2017 Savarit ................... G01C 21/00
(Continued)

FOREIGN PATENT DOCUMENTS

| FR | 2 787 895 A1 | 6/2000 |
| FR | 2 921 152 A1 | 3/2009 |

*Primary Examiner* — Jason Holloway
(74) *Attorney, Agent, or Firm* — Baker & Hostetler LLP (57) ABSTRACT

A method for automatically calculating a trajectory for an aircraft to re-join a reference route of the aircraft executed iteratively, in particular when the aircraft is no longer locked onto its reference route, each iteration comprising a step of detection of deviation from the active segment of the route; if the deviation from the active segment of the route is detected, the method comprises a step of selection of a route segment to be re-joined, a step of calculation of a re-joining trajectory between a starting point and the route segment to be re-joined, and a step of validation of the trajectory of the route segment to be re-joined. Where this trajectory is validated, the method comprises a step of assignment of the re-joining trajectory for the segment to the re-joining trajectory for the route. Otherwise, it comprises a step of verification of the existence of a next route segment fulfilling a selection condition. If a next route segment fulfils a selection condition, it comprises a step of selection of the next route segment as route segment to be re-joined, and a return to the step of calculation of a re-joining trajectory for the route segment to be re-joined. If no route segment fulfils the selection condition, it comprises a step of application of
(Continued)

an exit procedure. A computer program for implementing this method is provided.

17 Claims, 7 Drawing Sheets

(51) Int. Cl.
*G05D 1/10* (2006.01)
*G01C 21/20* (2006.01)
(52) U.S. Cl.
CPC ......... *G08G 5/0021* (2013.01); *G08G 5/0052* (2013.01)

(56) References Cited

U.S. PATENT DOCUMENTS

| | | | |
|---|---|---|---|
| 2006/0025899 A1 | 2/2006 | Peckham et al. | |
| 2009/0076717 A1* | 3/2009 | Goutelard | G01C 21/00 701/122 |
| 2009/0076721 A1 | 3/2009 | Coulmeau et al. | |
| 2010/0324812 A1 | 12/2010 | Sacle et al. | |
| 2015/0262490 A1* | 9/2015 | Deker | G08G 5/0052 701/3 |
| 2015/0310746 A1* | 10/2015 | Albert | G08G 5/0047 701/3 |
| 2016/0180715 A1* | 6/2016 | Burke | G08G 5/0008 701/467 |
| 2017/0030734 A1* | 2/2017 | Shafaat | G01C 23/005 |

* cited by examiner

METHOD FOR AUTOMATICALLY RE-JOINING A ROUTE OF AN AIRCRAFT

CROSS-REFERENCE TO RELATED APPLICATIONS

This application is a National Stage of International patent application PCT/EP2015/081308, filed on Dec. 28, 2015, which claims priority to foreign French patent application No. FR 1403023, filed on Dec. 30, 2014, the disclosures of which are incorporated by reference in their entirety.

FIELD OF THE INVENTION

The present invention relates to the avionics field. More specifically, it relates to aircraft trajectory calculation and guidance.

BACKGROUND

In the field of air navigation, an aircraft trajectory comprises a horizontal dimension and a vertical dimension. The skeleton outline of the horizontal trajectory of an aircraft is called route which consists of a sequence of flight plan points joined by segments. Each of these segments is defined between two waypoints, the end waypoint of a segment also forming the initial waypoint of the next segment of the route. The waypoints can for example be defined by the location of radio navigation beacons, or by geographic coordinates.

For air navigation, an aircraft generally determines its trajectory by following a route and a vertical trajectory calculated in advance. The reference route can for example be a pre-calculated standard route, or a route calculated by a flight management computer to best link a starting point and an arrival point. In this case, the aircraft successively follows each of the segments of the route. When it follows one of the segments of the route, its objective is the end waypoint of said segment. As soon as it has passed this waypoint, it follows the next segment. The action of selecting a new waypoint to be followed is called sequencing from the current waypoint. The segment followed at a given instant is called active segment.

The aircraft generally operates in a so-called managed guidance mode, a mode in which its horizontal trajectory automatically follows the reference route. In this mode, the aircraft is locked onto the route, in other words guidance laws are applied to the aircraft in order for it to follow the route step by step. However, the aircraft can sometimes deviate from the reference route. For example, it can deviate from the reference route if air traffic control instructs it so for safety reasons.

A flight management computer according to the prior art does not provide any method for permanently proposing a satisfactory re-joining trajectory when the aircraft deviates from a reference route. Indeed, the only indication provided by a flight management computer according to the prior art is a straight-line distance with respect to the next waypoint. However, this distance does not indicate if the waypoint will be able to be reached in satisfactory conditions. The patent FR2921152 proposes a method for assisting in re-joining a route. This patent describes a method for automatically selecting a waypoint to be re-joined when an aircraft is no longer in managed mode. However, this method does not make it possible to calculate the re-joining trajectory itself. It is not therefore permanently executed for the aircraft to permanently have a proposition of trajectory to be followed without the intervention of a pilot.

The object of the invention is to go beyond the limitations of the prior art. Its aim is notably a method for permanently proposing a continuous, flyable re-joining trajectory for a reference route of an aircraft, recalculated periodically at each new position of the aeroplane.

SUMMARY OF THE INVENTION

To this end, the subject of the invention is a method for automatically calculating a trajectory for an aircraft to re-join a reference route of the aircraft, executed iteratively each time the aircraft advances notably when the aircraft is not locked onto said route, each iteration comprising at least: detecting a deviation from an active segment of said route; if the deviation from the active segment of said route is detected: selecting a route segment to be re-joined; calculating a re-joining trajectory between a starting point and said route segment to be re-joined; validating the re-joining trajectory for said route segment to be re-joined; if the re-joining trajectory for said route segment to be re-joined is validated: assigning the re-joining trajectory for said route segment to be re-joined to the trajectory for re-joining the aircraft route; if the re-joining trajectory for said route segment to be re-joined is not validated: verifying the existence of a next route segment fulfilling a selection condition; if a next route segment fulfils said selection condition; selecting said next route segment as route segment to be re-joined; returning to calculating a re-joining trajectory for the route segment to be re-joined; if no next route segment fulfils said selection condition: applying an exit procedure.

Advantageously, the method comprises, prior to selecting a route segment to be re-joined, a determining the initial point of the re-joining trajectory at least from a current position of the aircraft.

In an embodiment of the invention, the position of the aircraft at the initial point of the trajectory is determined from a predicted state of the aircraft by maintaining the current guidance mode for a predefined duration.

Advantageously, the method further comprises a preliminary step of verification that the aeroplane is not locked according to a so-called managed mode onto the active route of the aircraft.

In one embodiment of the invention, the condition of deviation from said route is verified when a distance between the aircraft and the route is greater than a predefined threshold.

In another embodiment of the invention, the condition of deviation from said route is verified when an angular deviation between the true route of the aircraft and the route is greater than a predefined threshold.

Advantageously, the selecting a route segment to be re-joined selects the active segment when the condition of deviation from said route has been verified.

In one embodiment of the invention, calculating a re-joining trajectory for said segment uses a predefined re-joining angle.

Advantageously, the re-joining trajectory for the segment is validated if said re-joining trajectory for the segment does not bear out a condition of sequencing from the end waypoint of the segment.

Advantageously, the condition of sequencing from the end waypoint of the segment is verified if the re-joining trajectory for the segment crosses a plane containing the end waypoint of the segment.

Advantageously, said plane is a vertical plane, called sequencing plane, defined by: if the route of the aircraft does not include any obligation to overfly the end waypoint of the segment, a plane bisecting the horizontal angle between the segment to be re-joined and the next segment; if the route of the aircraft includes an obligation to overfly the end waypoint of the segment, a plane at right angles to the active segment containing the end waypoint of said active segment.

In an embodiment of the invention, when the condition of sequencing from at least one end waypoint of a segment is borne out, the re-joining trajectory for the segment is saved until the point at which it crosses said plane containing the end waypoint of the segment; the next step of calculation of a re-joining trajectory for the route segment following the sequenced segment is initialized using said saved trajectory.

In one embodiment of the invention, applying an exit procedure comprises calculating a forced re-joining trajectory for a final waypoint.

In one embodiment of the invention, applying an exit procedure of the method comprises raising an alert.

Advantageously, the last segment is by default the one for which the final waypoint is the final approach point.

Advantageously, the last segment can also be determined by the pilot upstream of this final approach point.

The invention also relates to a trajectory calculation system, comprising computation means configured to automatically and iteratively calculate a re-joining trajectory for an aircraft, each iteration comprising at least: detecting a deviation from the active segment of said route; if the deviation from the active segment of said route is detected: selecting a route segment to be re-joined; calculating a re-joining trajectory between a starting point and said route segment to be re-joined; validating the re-joining trajectory for said route segment to be re-joined; if the re-joining trajectory for said route segment to be re-joined is validated: assigning the re-joining trajectory for said route segment to be re-joined to the trajectory for re-joining the aircraft route; if the re-joining trajectory for said route segment to be re-joined is not validated: verifying the existence of a next route segment fulfilling a selection condition; if a next route segment fulfils said selection condition; selecting said next route segment as route segment to be re-joined; returning to calculating a re-joining trajectory for the route segment to be re-joined; if no next route segment fulfils said selection condition: applying an exit procedure.

The invention relates also to a computer program intended to automatically and iteratively calculate a re-joining trajectory for a route of an aircraft, said program comprising at least for each iteration: code elements configured to detect a deviation from an active segment of said route; computer code elements configured to carry out the following operations when the deviation from the active segment of said route is detected: selecting a route segment to be re-joined; calculating a re-joining trajectory between a starting point and said route segment to be re-joined; validating the re-joining trajectory for said route segment to be re-joined; if the re-joining trajectory for said route segment to be re-joined is validated: assigning the re-joining trajectory for said route segment to be re-joined to the trajectory for re-joining the aircraft route; if the re-joining trajectory for said route segment to be re-joined is not validated: verifying the existence of a next route segment fulfilling a selection condition; if a next route segment fulfils said selection condition; selecting said next route segment as route segment to be re-joined; returning to calculating a re-joining trajectory for the route segment to be re-joined; if no next route segment fulfils said selection condition: applying an exit procedure.

A method according to the invention offers numerous advantages. It makes it possible to permanently propose a re-joining trajectory for a route to a pilot when an aircraft deviates without being locked thereon from its reference route.

It thus makes it possible to lighten the work load of a pilot in the event of an unpredicted event, by allowing him or her the possibility of immediately engaging the re-joining trajectory which is presented to him or her and thus give him or her greater trust in the capacity of the aircraft to re-join and follow the active route.

A method according to the invention is flexible on the modes for re-joining a route. In particular, it allows for a re-joining according to "normal" re-joining modes in which the re-joining angle is customizable, and, when these "normal" re-joining modes do not make it possible to correctly re-join the trajectory, re-joining modes from a end waypoint of the route governed by more flexible constraints.

BRIEF DESCRIPTION OF THE DRAWINGS

Other features will become apparent on reading the following detailed description, given as an example and in a non-limiting manner, given in light of the attached drawings which represent.

Some English acronyms commonly used in the technical field of the present application may be used in the description. These acronyms are listed in the table below.

| Acronym | Expression | Meaning |
| --- | --- | --- |
| DB | Database | Container making it possible to store and retrieve all of the information related to an activity. Generally in computerized form. |
| FAF | Final Approach Fix | Final fixed point of an aircraft trajectory before landing, from which it generally begins the final approach flight segment. |
| FMD | Flight Management Display | Flight display system incorporated in an FMS system. |
| FMS | Flight Management System | Computerized system making it possible to calculate aircraft trajectories and flight plans, and to provide suitable guidance set points to the pilot or automatic pilot to follow the calculated trajectory. |
| KCCU | Keyboard Console Control Unit | Human-machine interface that can be incorporated in a cockpit comprising a keyboard in order for the pilot to enter information in the FMS. |

-continued

| Acronym | Expression | Meaning |
|---|---|---|
| MCDU | Multi Control Display Unit | Human-machine interface that can be incorporated in a cockpit making it possible to display and input large quantities of information linked to the FMS. |
| ND | Navigation Display | Cockpit display element showing the lateral flight trajectory. |
| NDB | Non Directional Beacon | Radio navigation beacon making it possible to determine the distance from the aeroplane to the beacon, by the use of a compass. |
| RNP | Required Navigation Performance | Navigation requirement specifying the 3D points that can be accessed by an aircraft when flying a trajectory. Generally, it consists of a distance tolerance relative to a set of 3D points embodying a predicted trajectory. |
| VD | Vertical Display | Display element that can be incorporated in a cockpit, and displaying the vertical trajectory of the aircraft. |
| VHF | Very High Frequency | The very high frequency band is the part of the radio frequency spectrum extending from 30 MHz to 300 MHz. |
| VOR | VHF Omnidirectional Range | Radio frequency positioning system used in air navigation and operating with the VHF frequencies. |

DETAILED DESCRIPTION

Hereinafter in the description, the method according to the invention is illustrated by examples relating to the calculation, on-board an aircraft, of a re-joining trajectory for a reference route.

Figure 1:
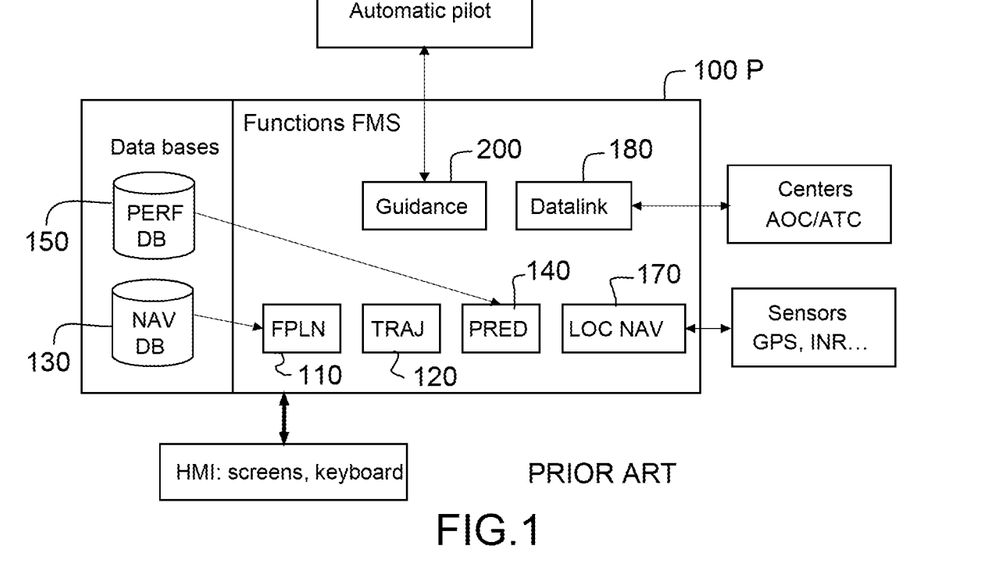
FIG. 1, a flight management system according to the prior art.

FIG. 1 represents a system of FMS type known from the prior art.

A flight management system can be implemented by at least one computer embedded on-board the aircraft. The FMS 100 notably determines a flight plan profile geometry followed by the aircraft. The trajectory is calculated in four dimensions: three spatial dimensions and one time/speed profile dimension. The FMS 100 also transmits to a pilot, via a first pilot interface, or to an automatic pilot, guidance set points calculated by the FMS 100 to follow the flight profile.

A flight management system can comprise one or more databases such as the database PERF DB 150, and the database NAV DB 130. The databases PERF DB 150 and NAV DB 130 respectively comprise aircraft performances data and air navigation data, such as routes and beacons.

The management of a flight plan according to the prior art can involve means for the crew of the aircraft to create/modify a flight plan through one or more human-machine interfaces, for example:
an MCDU;
a KCCU;
an FMD;
an ND;
a VD.

One capacity of the FMS 100 can be a flight plan management function 110, usually called FPLN. The FPLN capability 110 notably allows for management of different geographic elements that make up a skeleton of a route to be followed by the aircraft, comprising: a departure airport, waypoints, airways to be followed, an arrival airport. The FPLN capability 110 also allows for a management of different procedures forming part of a flight plan such as: a departure procedure, an arrival procedure, one or more holding pattern procedures. The FPLN capability 110 notably allows for the creation, the modification, the deletion of a primary or secondary flight plan.

The flight plan and all its varied information linked notably to the corresponding trajectory calculated by the FMS can be displayed for consultation by the crew through the display devices, also called human-machine interfaces, present in the cockpit of the aircraft, like an FMD, an ND, a VD. The VD notably displays a vertical flight profile.

The FPLN capability 110 involves data stored in databases NAV DB 130 for constructing a flight plan and the associated trajectory. The database NAV DB 130 can for example include the following elements: geographic points, beacons, air routes, departure procedures, arrival procedures, and altitude, speed or slope constraints.

One capability of the FMS, named TRAJ 120 in FIG. 1, makes it possible to calculate a lateral trajectory for the flight plan defined by the FPLN capability 110. The TRAJ 120 capability notably constructs a continuous trajectory from points of an initial flight plan while respecting the performance levels of the aircraft. The initial flight plan can be an active, temporary or secondary flight plan. The continuous trajectory can be presented to the pilot by means of one of the human-machine interfaces.

One capability of the FMS 100 can be a trajectory prediction function PRED 140. The prediction function PRED 140 notably constructs an optimized vertical profile from the lateral trajectory of the aircraft, supplied by the TRAJ 120 function. To this end, the prediction function PRED 140 uses the data from the first database PERF DB 150. For example, the database PERF DB 150 can comprise aerodynamic parameters of the aircraft, or even characteristics of the engines of the aircraft. It notably contains the performance margins systematically applied in the prior art to guarantee safety margins on the descent and approach phases. The vertical profile can be presented to the pilot for example by means of a VD.

One capability of the FMS 100 can be a location function 3, named LOCNAV 170 in FIG. 1. The LOCNAV function 170 notably performs an optimized geographic location, in real time of the aircraft as a function of geo-location means embedded on board the aircraft.

One capability of the FMS 100 can be a guidance function 180. The guidance function 200 notably provides the automatic pilot or one of the human-machine interfaces with appropriate commands making it possible to guide the aircraft in lateral and vertical (altitude and speed) geographic planes for said aircraft to follow the trajectory planned in the initial flight plan.

Figure 2:
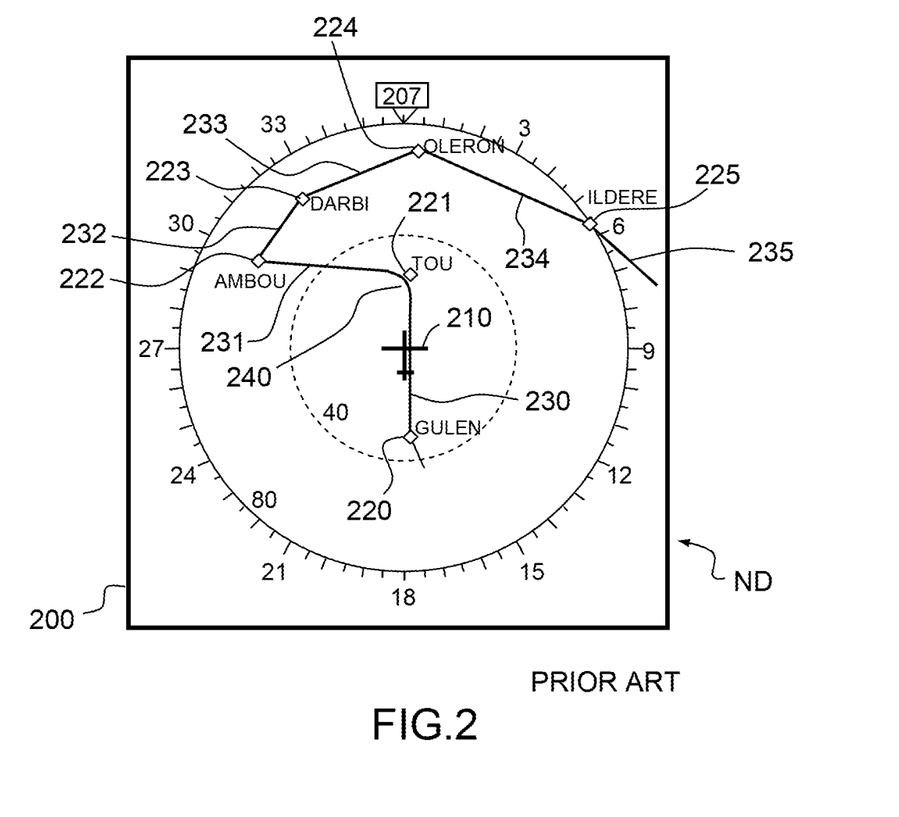
FIG. 2, a route of an aircraft according to the prior art.

FIG. 2 represents a horizontal route according to the prior art.

This route can for example be displayed on an equipment item of ND type and its representation is centred on the position 210 of the aircraft. The skeleton of this route is constructed from waypoints 220, 221, 222, 223, 224, 225. These points can for example be contained in the database NAV DB 130. They can for example be beacons of NDB or VOR type or geodesic points identified in the navigation database solely by their latitude and longitude coordinates.

Horizontal flight segments, or legs, are constructed from these waypoints to form the horizontal skeleton of the trajectory of the aircraft. A leg can be a straight segment, such as, for example, the legs 230, 231, 232, 233, 234 and 235. It can also be a curvilinear segment, for example the leg 240. During the construction of a horizontal trajectory, an FMS according to the prior art can use the aerodynamic performance levels of the aircraft to construct curvilinear segments having the appropriate radius of curvature.

Figure 3:
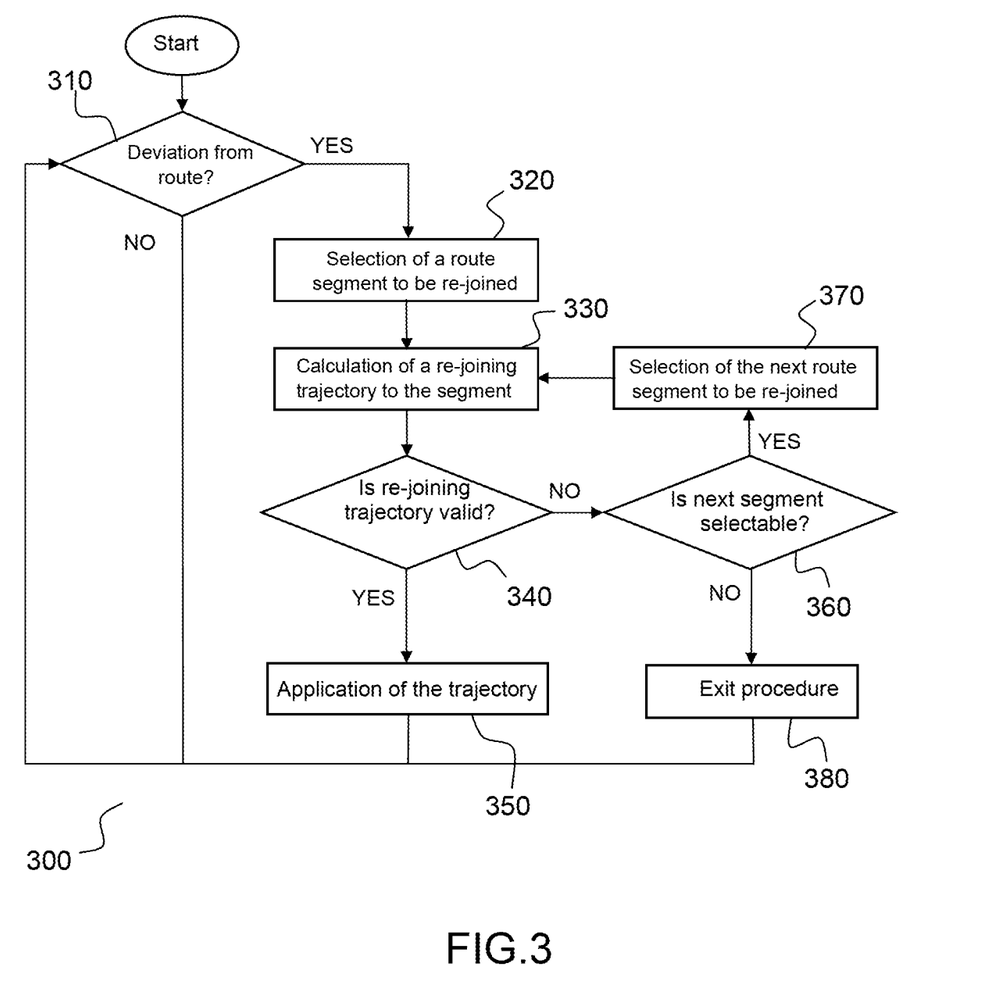
FIG. 3, a flow diagram of a method according to the invention.

FIG. 3 represents a flow diagram of a method 300 according to the invention.

The method according to the invention is intended to be executed iteratively. It comprises a step 310 of detection of a deviation from the route of the aircraft. The aircraft can for example be considered to have deviated from its route, if it is no longer in so-called managed mode.

In one set of embodiments of the invention, another condition of deviation from the aircraft route is a distance condition. In one embodiment of the invention, the condition of deviation from the route is validated if the distance between the aircraft and the closest point of the route is greater than a predefined threshold. In one embodiment of the invention, this threshold has a constant value, for example 2 nautical miles. In another embodiment of the invention, the deviation threshold can, at each instant, take the value of the required navigation performance (RNP) defined in a flight plan, or a value derived from this RNP value. In another embodiment of the invention, the condition of deviation from the route is a route angle deviation condition. In one embodiment of the invention, the condition of deviation is fulfilled if the absolute value of the difference between the true route of the aircraft and the active segment of the route is greater than a predefined threshold, for example 10°.

Other deviation criteria are possible. The deviation condition can for example take into account the heading of the aircraft, or the probability of the aircraft position to be in proximity to the route in the short term.

It is also possible to test a number of conditions successively or in combination. For example, it is possible to first test a distance condition and then a heading condition, and to validate the deviation from the route if at least one of these two conditions is true.

If the condition of deviation from the route is not validated, the aircraft can continue its trajectory in non-managed mode until the next iteration. Otherwise, the method 300 comprises a step 320 of selection of a route segment to be re-joined. The route segment to be re-joined is the first segment for which a re-joining trajectory calculation will be performed. In one embodiment of the invention, the step 320 selects the so-called active route segment, that is to say the segment on which the managed mode of the aircraft was locked at the instant when the deviation from the route was detected. In another embodiment of the invention, the step 320 selects the segment which would be active for a predicted position of the aircraft, for example the position that the aircraft would occupy at the end of a fixed time period by retaining its guidance mode. Other methods for selecting the route segment to be re-joined are possible, this selection being able to take into account parameters such as the position and the heading of the aircraft, or the distance of the aircraft relative to each of the segments of the route.

Once the route segment to be re-joined is selected, the method 300 comprises a step 330 of calculation of a lateral re-joining trajectory for the segment. The calculation of a trajectory between an aircraft and a segment is known from the prior art. The lateral re-joining trajectory for the segment is calculated in relation to an initial state of the aircraft. In an embodiment of the invention, the initial state of the aircraft is the state of the aircraft at the time of the calculation. In another embodiment of the invention, the initial state of the aircraft is a predicted state of the aircraft at the end of a short period. The lateral re-joining trajectory for the route of the aircraft takes into account the aerodynamic performance levels of the aircraft, in particular its turn capability. It can also observe constraints for the re-joining of the segment. For example, the re-joining trajectory can observe a route segment re-joining angle.

Once the trajectory is calculated, the method 300 comprises a step 340 of validation of the re-joining trajectory. This step 340 validates that the re-joining trajectory calculated in the step 330 validates at least one criterion of use. The re-joining trajectory can for example be validated if the aircraft does not fulfil a condition of sequencing from the end waypoint of the route segment to be re-joined. A sequencing condition is a condition, generally based on the state (position, speed, heading, etc.) of the aircraft and the position of the waypoint, defining whether the waypoint is considered to be "passed" by the aircraft and whether the next segment should be considered as active.

In one embodiment, the trajectory is validated if it does not cross a plane, called sequencing plane, from the end waypoint of the segment to be re-joined. The sequencing plane is a vertical plane comprising a waypoint and defining a half-space within which the waypoint is considered to be passed by the aircraft.

If the re-joining trajectory of the segment is validated, the method 300 according to the invention comprises a step 350 of application or assignment of the trajectory. This step consists in using the re-joining trajectory for the segment as re-joining trajectory for the route. The aircraft can then be locked by the re-engagement of the managed mode on this re-joining trajectory, until the reference route is effectively re-joined, or until a next iteration of calculation of the re-joining trajectory.

Otherwise, the method 300 according to the invention comprises a step 360 of determination of the existence of a next route segment fulfilling at least one selection criterion. This step consists generally in determining whether the re-joining trajectory can be applied to a next segment. In one embodiment of the invention, a re-joining trajectory can be applied to all the route segments. The step 360 then consists in determining whether or not the segment previously tested was the last. In another implementation of the invention, the re-joining trajectory can be calculated for all the route segments except those comprising the final approach. The step 360 then consists in determining whether there is still a segment in the route that does not form part of the final approach. In another embodiment of the invention, the re-joining trajectory can be applied only to the segments that fulfil certain criteria (for example, "not too short" length segments). The step 360 then consists in determining whether there is still at least one route segment that fulfils said criteria.

In one embodiment of the invention, the route segments that can be used for the calculation of the re-joining trajectory are determined on initialization of the route. They are then stored in a list, according to their order in the route. The route segments are removed from the list each time a waypoint is sequenced, or a re-joining trajectory is not validated in the step 340. Step 360 then consists in verifying whether there is still at least one route segment in said list.

In another embodiment of the invention, the step 360 successively tests all the segments still not covered in the route, and successively tests, on each of them, the at least one selection criterion.

If at least one next route segment can be selected, the method 300 according to the invention comprises a step 370 of selection of the next route segment to be re-joined. This step comprises the selection of the first route segment for which the at least one selection criterion is fulfilled. On completion of the step 370, the step 330 is reactivated in order to calculate a lateral re-joining trajectory for this new segment to be re-joined, and so on until a re-joining trajectory is validated, or all the route segments that can be selected have been tested.

If, in the step 370, no following segment can be selected, an exit procedure 380 is activated. This exit procedure can for example comprise a cockpit alert. It can also comprise a calculation of forced re-joining trajectory for the route.

The method according to the invention is particularly advantageous. Indeed, it makes it possible to provide ongoing assistance to the pilot for the re-joining of a reference route in case of deviation therefrom. It makes it possible to re-join the nearest route segment that validates a set of criteria. Furthermore, a suitable selection of the trajectory validation criteria makes it possible to obtain consistency in the calculation of the re-joining trajectory: on the next iteration, if the aircraft remains on its current trajectory and is still deviated from the route, the remaining re-joining trajectory will be calculated practically identically compared to the initial calculation. Thus, the process can be executed iteratively as long as the pilot of the aircraft has not chosen to re-join its reference route by activating its managed mode.

In one embodiment of the invention, the method 300 is executed when the managed lateral mode is disengaged, and is terminated when it is re-engaged. For example, the method can start with the disengagement from the managed lateral mode, initiated by a pilot or a flight management computer for example. Similarly, it can stop being executed when the aircraft has re-joined its route and the managed mode is re-engaged, on the initiative of the pilot or of a flight management computer for example. In this embodiment of the invention, the method automatically performs the tasks normally assigned to the pilot when exiting from the managed mode, and thus lightens the workload thereof to return to its reference route.

In another embodiment of the invention, the method is executed permanently. It is then the method which provokes the disengagement from the managed mode, when it detects, in the step 310, the deviation from the route. Conversely, the method can provoke, when it detects that the deviation from the route is no longer validated in the step 310, the re-engagement of the managed mode, if this mode was previously disengaged by the system, and not by the pilot.

Figure 4:
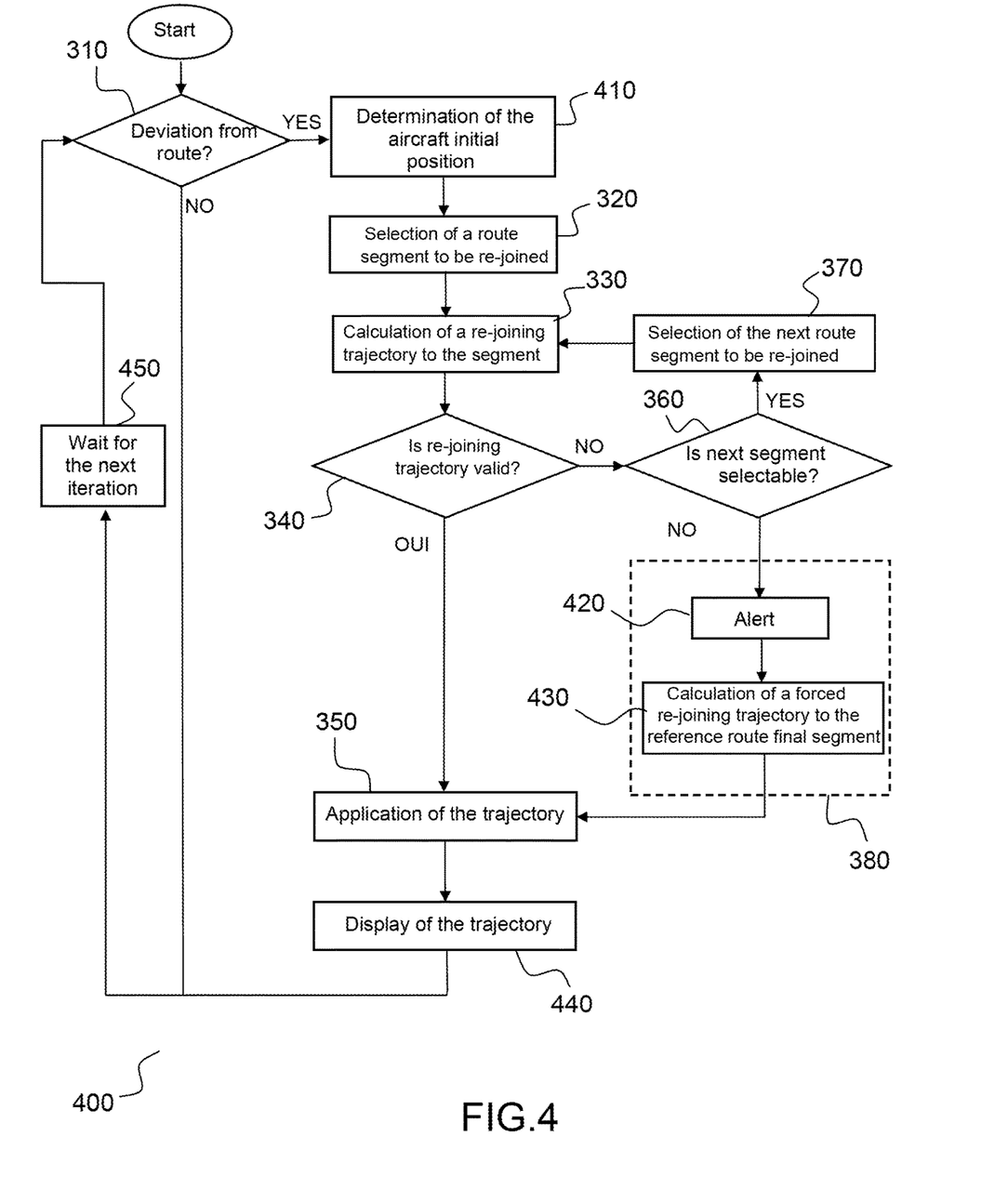
FIG. 4, a flow diagram of an exemplary method according to the invention.

FIG. 4 represents an example of the flow diagram of the method according to the invention.

This method 400 comprises the steps 310, 320, 330, 340, 350, 360, and 370 present in the method 300. It also comprises, prior to the step 320, a step 410 of determination of the initial position of the aircraft. In one embodiment of the invention, the step 410 considers the current position of the aircraft as initial position of the re-joining trajectory. In another embodiment of the invention, it uses for the initial position a predicted position of the aircraft at the end of a predefined period, in order to take into account the change in the position of the aircraft during the time of calculation and of activation of the re-joining trajectory. It can for example consist in extrapolating the motion vector of the aircraft for a predefined period in order to obtain the predicted position of the aircraft. It can also predict the position of the aircraft by retaining its guidance mode for a predefined duration.

If the aircraft is in a turn phase, the step 410 can also predict the position of the aircraft at the end of a predefined period if it continues with its turn. In one embodiment of the invention, this step calculates only the position of the aircraft. It can also predict the heading and the speed of the aircraft, and other values representative of the state of the aircraft at the initial point of the re-joining trajectory.

In the method 400, the exit procedure 380 comprises an alert sub step 420. This alert can for example be a cockpit alert intended for an aircraft pilot, in the form of a visual and/or light indication alert.

In this embodiment of the invention, it also comprises a sub step 430 of calculation of a forced re-joining trajectory for the last waypoint of the route. This step makes it possible to automatically obtain a trajectory, even if it is not optimal, rather than return to manual mode. The calculation of the forced re-joining trajectory makes it possible to perform a trajectory calculation with lower constraints than for the trajectory calculations in the step 330, which have not been validated. For example, if the condition for validation of the trajectory in the step 340 is a passing of a sequencing plan from a waypoint, the forced re-joining trajectory can be calculated even if a part of the trajectory goes beyond the sequencing plan of the final waypoint. This embodiment of the invention is particularly advantageous, because it makes it possible to automatically propose a re-joining trajectory for the route, even if the segment re-joining criteria calculated in the step 330 have not been validated.

The method 400 also comprises, once the re-joining trajectory has been applied, a step 440 for the display of the trajectory. This step makes it possible to inform a pilot or an operator of the trajectory retained. The display can for example be provided in the cockpit for the pilot. The retained trajectory can also be transmitted to and displayed on a control station on the ground. The trajectory can also be displayed according to different colours depending on whether it is a re-joining trajectory calculated in the step 330 or a forced re-joining trajectory.

The method 400 also comprises a step 450 of waiting for the next iteration. This step makes it possible to distribute the iterations of re-joining trajectory calculation over time in the most appropriate manner.

In one embodiment of the invention, the calculation of the re-joining trajectory is performed periodically. The step 450 then consists in waiting for the end of a period in order to launch new calculation iteration. The period can for example be chosen as a function of a calculation capability embedded in an aircraft, in order to ensure that a computation capability is available for each iteration for the calculation of the trajectory. The period can also be chosen according to operational criteria, for example as a function of the maximum speed of the aircraft in order to ensure that the aircraft has not deviated by a maximum distance from the route during the calculation of a re-joining trajectory.

In another embodiment of the invention, the waiting time between two iterations is variable. It can also vary as a function of the flight phase of the aircraft, with more frequent iterations in the descent phase. It can also vary as a function of the instantaneous speed of the aircraft, in order to ensure the re-joining trajectory calculation iteration each time the aircraft covers no more than a predefined distance.

Figures 5A, 5B, 5C:
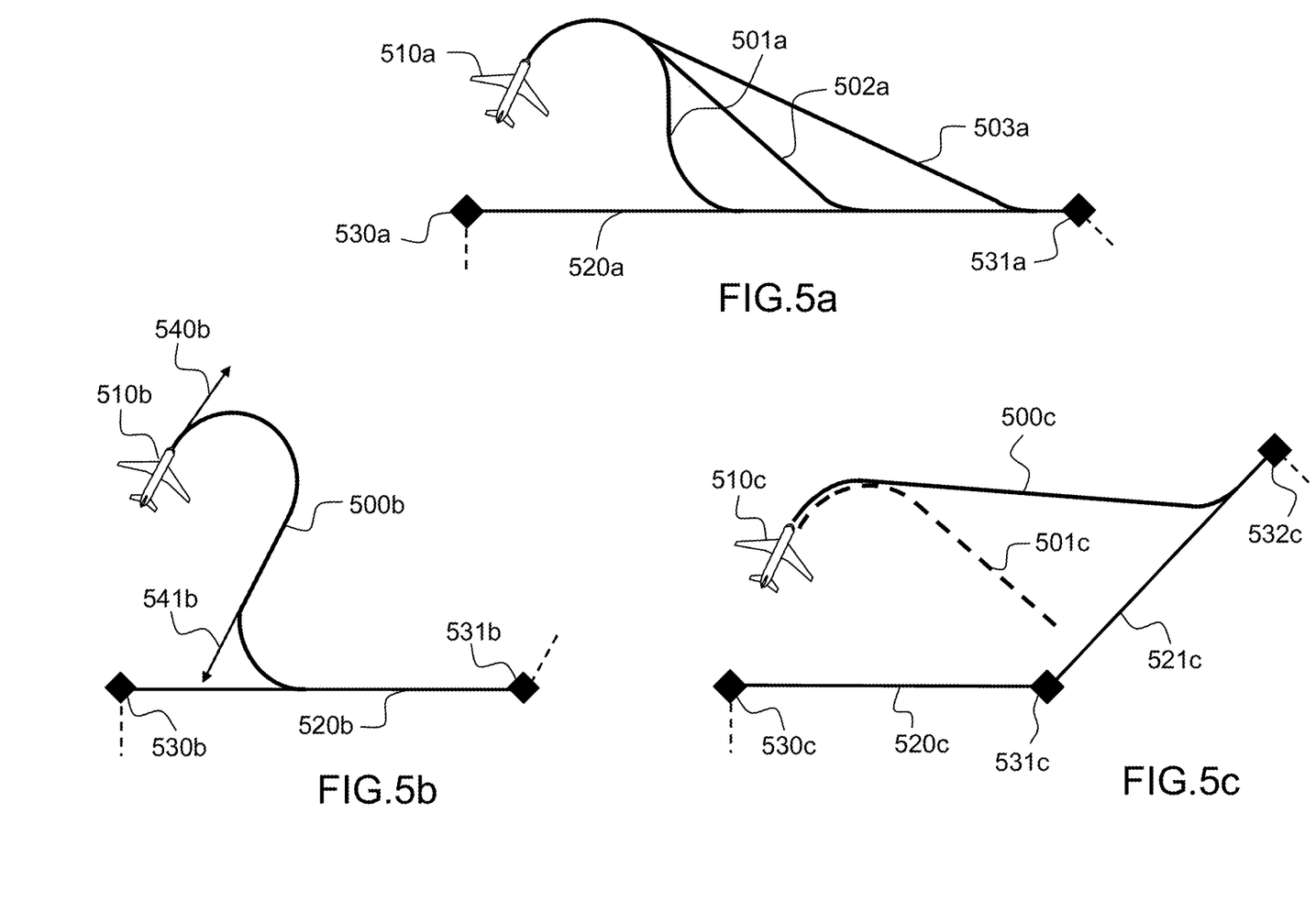
FIGS. 5a, 5b and 5c, three exemplary re-joining trajectories for a route segment calculated by a method according to embodiments of the invention.

FIGS. 5a, 5b and 5c represent five examples of re-joining trajectories for a route calculated by a method according to embodiments of the invention.

FIG. 5a represents three examples of re-joining trajectories 501a, 502a and 503a for a route segment according to one embodiment of the invention, each of them having been calculated with a different re-joining angle parameter.

Each of these trajectories has been calculated, for example in the step 330 of the method 300, to re-join the active segment 520a of a route from the position 510a of the aircraft. The active segment 520a of the route is characterized by an initial waypoint 530a and a end waypoint 531a.

In one embodiment of the invention, the calculation of a re-joining trajectory for a route segment takes as input parameters the position and the initial heading of the aircraft, a maximum turn radius and a segment re-joining angle.

In one embodiment of the invention, the re-joining trajectory is calculated using the following steps:
- a step of construction of a first circular arc, from the initial position and heading for the re-joining, for example with the minimum turn radius of the aircraft, until the desired re-joining angle between the heading of the aircraft and the route segment is reached;
- a step of construction of a rectilinear segment, tangential to the first circular arc, and exhibiting the desired re-joining angle relative to the route segment;
- a step of construction of a second circular arc, between the rectilinear segment and the route segment, for example with the minimum turn radius of the aircraft.

In this embodiment of the invention, the first circular arc makes it possible for the aircraft to perform a turn bringing it to the desired angle relative to the route segment to be re-joined; the rectilinear segment makes it possible for the aircraft to approach the route segment; the second circular arc makes it possible for the aircraft to perform a turn to capture the reference route segment to be re-joined by describing a line tangential to it.

In another embodiment of the invention, the re-joining trajectory is calculated directly between an initial position and the final waypoint of the route segment to be re-joined. It can for example be calculated according to the method described in the patent FR2787895.

The trajectories 501a, 502a and 503a are respectively calculated with re-joining angles of 90°, 45° and 30°. This angle can be customizable, for example as a function of operational conditions. A re-joining at 90° makes it possible for example to re-join short route segments, whereas a re-joining at 30° makes it possible to cover a shorter distance to the final waypoint 531a, and potentially limit the deviation between the time of passage provided on the reference route and the time of passage after deviating from and re-joining the route. In one embodiment of the invention, the trajectories are all calculated with the same predefined re-joining angle. In another embodiment of the invention, the re-joining angle is chosen as a function of the length of the route segment to be re-joined and of the position of the aircraft, in order to minimize the total distance covered.

FIG. 5b represents an example of a re-joining trajectory 500b for a route segment according to one embodiment of the invention. This re-joining trajectory is calculated between the position of an aircraft 510b and the active segment 520b of the reference route, said active segment comprising an initial waypoint 530b and end waypoint 531b. This trajectory can notably be calculated in the step 330 of a method 300. In one embodiment of the invention, the calculation of the re-joining trajectory for the segment takes as parameter the position 510b and the heading 540b of the aircraft, the heading selected by the pilot for the automatic pilot 541b as well as a turn radius.

The trajectory can for example be calculated using the following steps:
- a step of construction of a first circular arc, from the initial position and heading for the re-joining, for example with the minimum turn radius of the aircraft, until the heading selected by the pilot for the automatic pilot is reached;
- a step of construction of a rectilinear segment, tangential to the first circular arc turn, and having the heading selected by the pilot for the automatic pilot;
- a step of construction of a second circular arc, between the rectilinear segment and the active route segment, for example with the minimum turn radius of the aircraft.

This method for calculating the re-joining trajectory is particularly advantageous, because it makes it possible to re-join short route segments.

FIG. 5c represents an exemplary re-joining trajectory 500c for a route segment according to one embodiment of the invention.

The route contains in particular the two segments 520c and 521c, defined by the waypoints 530c, 531c and 532c. The aircraft occupies an initial position 510c, and the route segment active during the calculation of the re-joining trajectory is the segment 520c. Initially, the step 320 selects the active route segment 520c as route segment to be re-joined. A first calculation for re-joining this segment is performed in the step 330. The calculation method used is identical to that for the re-joining trajectory 502a, with a re-joining angle 45°. The trajectory 501c does not make it possible to re-join the segment 520c satisfactorily. It is not therefore validated in the step 340. The step 360 then verifies that at least one next segment can be selected. Such is the case with the segment 521c, which is then selected in the step 370. The step 330 of calculation of a re-joining trajectory is then re-initiated, this time to re-join the segment 521c, with the same calculation method and a re-joining angle at 45°. This time, the route segment can be reached. The re-joining trajectory 500c is therefore validated in the step 340, and applied as re-joining trajectory for the route in the step 350.

These examples demonstrate the capacity of a method according to the invention to calculate a re-joining trajectory for a route, with different parameters, and the capacity to select a reference route new segment to be re-joined if the active segment cannot be reached.

Figure 6A:
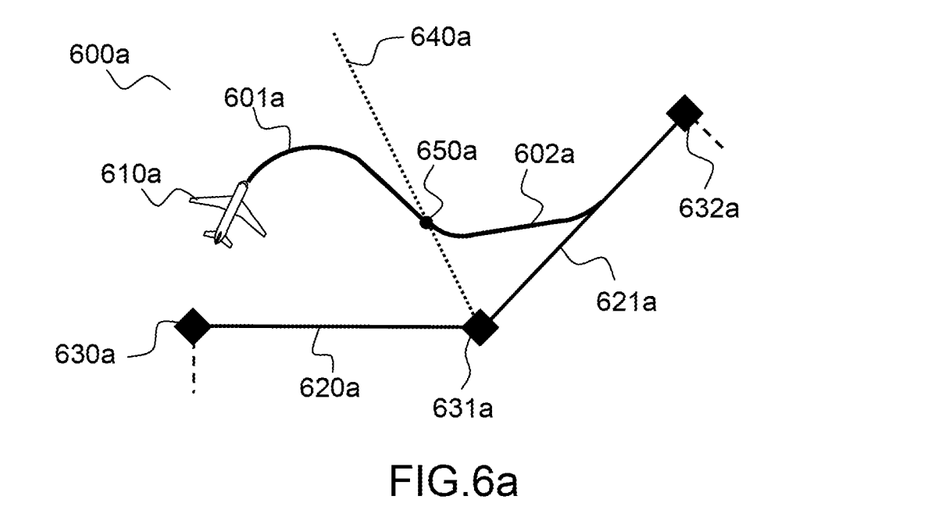
FIGS. 6a and 6b, two examples of re-joining trajectories for a route segment calculated by a method according to an embodiment of the invention, with conservation of the initial trajectories between the different waypoints.
Figure 6B:
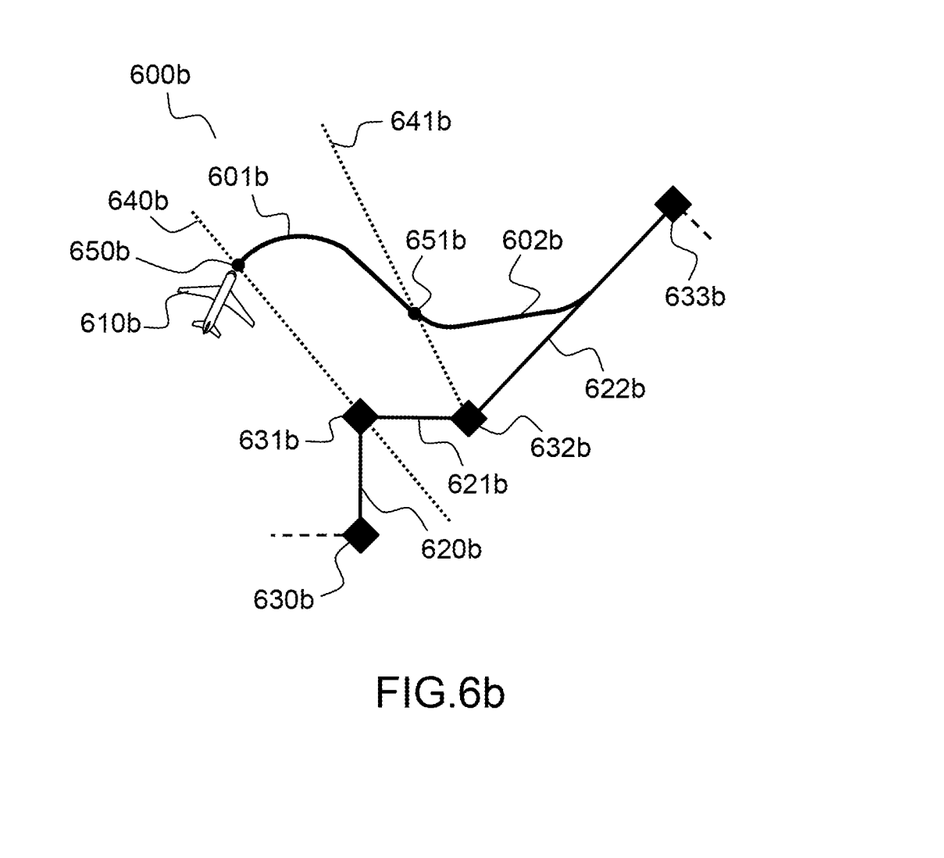

FIGS. 6a and 6b represent two examples of re-joining trajectories for a route segment calculated by a method according to one embodiment of the invention, with the initial trajectories between the different waypoints being retained.

FIG. 6a represents an example of calculation of a re-joining trajectory 600a for an aircraft route segment according to one embodiment of the invention. The aircraft occupies a position 610a, and the route has at least two segments 620a and 621a, according to three waypoints 630a, 631a and 632a.

In one embodiment of the invention, a first re-joining trajectory is calculated in the step 330 to re-join the active segment 620a. This re-joining trajectory comprises a first part 601a, and passes through a plane 640a, called sequencing plane of the waypoint 631a at a point 650a. The plane 640a represents the plane from which the aircraft is considered to have "passed" the waypoint 631a.

In one embodiment of the invention, the trajectory 601a is not validated if it passes through the plane 640a at least at one point, the point 650a in this case. Advantageously, the sequencing plane for the point 631a can be a vertical plane comprising the point 631a and the bisector of the route segments for which the point 631a is respectively the end and initial waypoint.

In one embodiment of the invention, when the trajectory is not validated, a first part 601a of the trajectory, between the initial point 610a of the trajectory and the point 650a at which it crosses the sequencing plane of a waypoint, is saved for the next calculation step. Thus, the segment 621a is selected in the step 370 as next segment to be re-joined, and the re-joining trajectory comprises a first part 601a previously saved, and a second part 602a making it possible to finalize the re-joining trajectory up to the segment 621a. Obviously, it is possible to save several successive sub-parts of the trajectory when the re-joining trajectory is calculated over more than two successive segments.

FIG. 6b represents an example of calculation of a re-joining trajectory 600b for an aircraft route segment according to one embodiment of the invention.

In this example, the aircraft occupies a position 610b, and the route comprises at least three segments 620b, 621b and 622b, and four waypoints 630b, 631b, 632b and 633b. In this example, the step 320 of selection of the route segment to be re-joined selects the segment 621b rather than the active segment 620b as route segment to be re-joined. Indeed, the position of the aircraft 610b is too close to the point 650b of the sequencing plane 640b of the end waypoint 631b of the active segment 620b to make it possible to calculate a correct re-joining trajectory for said segment.

The step 330 therefore calculates a first re-joining trajectory for the segment 621b. This trajectory is not validated in the step 340, because it crosses the sequencing plane 641b of the waypoint 632b at the point 651b. A first part of the trajectory 601b is then saved, situated between the position 610b of the aircraft and the point 651b at which the sequencing plane of the waypoint 632b is crossed. The step 360 then validates the existence of a next segment to be re-joined, in this case the segment 622b, and the step 370 selects it as reference route segment to be re-joined.

The step 330 then calculates a second part of trajectory 602b, making it possible to re-join the segment 622b from the point 651b. The step 340 then validates the trajectory 600b, formed by the two parts 601b and 602b, as re-joining trajectory for the route of the aircraft.

Figure 7A:
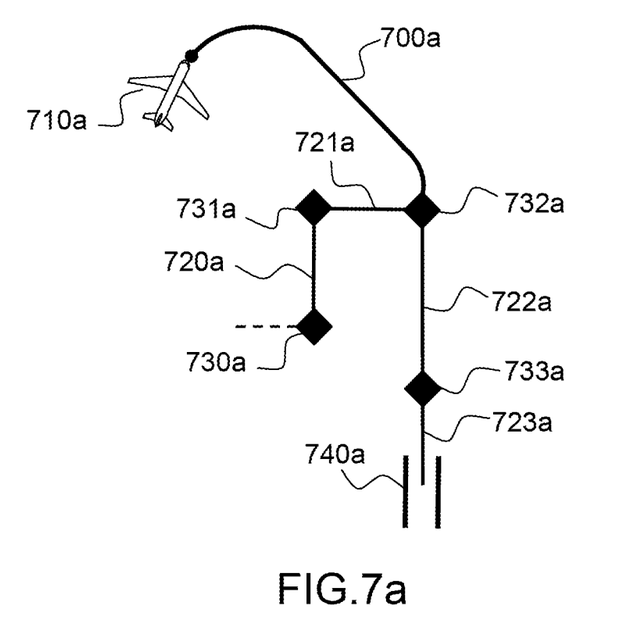
FIGS. 7a and 7b, two examples of forced re-joining trajectory for a final waypoint of a route by an exemplary method according to an embodiment of the invention.
Figure 7B:
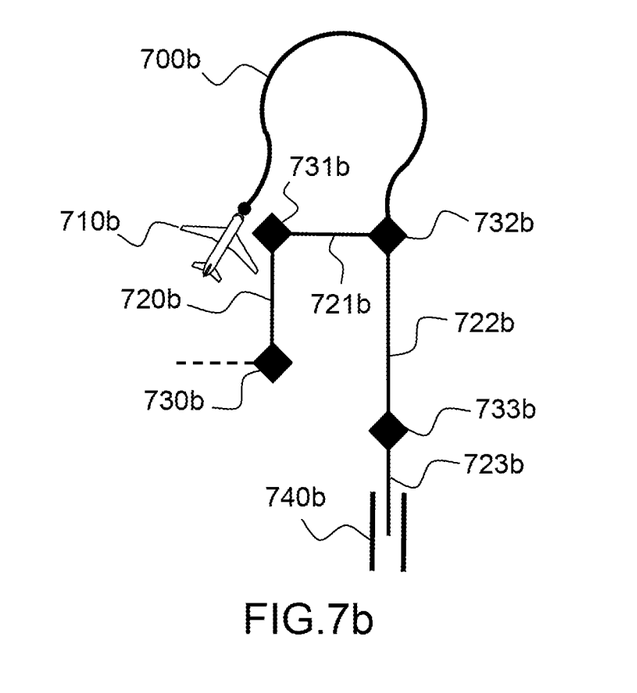

FIGS. 7a and 7b represent two examples of forced re-joining trajectory for a final waypoint of a route according to one embodiment of the invention.

These forced re-joining trajectories can for example be calculated in the step 430 of the method 400 when no re-joining trajectory for a route segment has been validated, and there are no more route segments available. They make it possible to calculate a re-joining trajectory with more flexible constraints than the trajectories calculated and validated in the steps 330 and 340 of a method 300 according to the invention.

FIG. 7a represents a first example of a forced re-joining 700a of a final waypoint of a route according to one embodiment of the invention.

The aircraft, occupying a position 710a, is deviated from its route, which comprises the segments 720a, 721a, 722a and 723a, as well as the waypoints 730a, 731a, 732a and 733a. The waypoint 732a is the point called FAF, that is to say the initial point of the final approach. The final approach comprises the segments 722a and 723a, the waypoint 733a and leads to the landing runway 740a.

In this example, it is not possible, for air safety reasons, to re-join one of the segments 722a and 723a by a conventional re-joining trajectory. The aircraft in effect has to come to the FAF with a heading aligned with the landing runway in order to be able to perform its final approach in an appropriate manner. The steps 330 and 340 of a method according to the invention have not made it possible to calculate and validate a re-joining trajectory for the route segments 720a and 721a. The step 360 then detects that no next segment can be selected, and activates the exit procedure 380. In a set of embodiments of the invention, this exit procedure comprises a step of calculation of a forced re-joining trajectory for the last waypoint of the trajectory, for example the step 430 of the method 400. In this example, the last waypoint of the trajectory is the FAF 732a.

In one embodiment of the invention, the calculation of the forced re-joining trajectory for a waypoint obeys different constraints by those of the calculation performed in the step 330. In a set of embodiments of the invention, the calculation of a forced re-joining trajectory makes it possible to re-join a waypoint 732a, with a heading oriented according to the route segment 722a for which this waypoint is the initial waypoint. The calculation of the forced re-joining trajectory 700a can for example comprise the following steps:

a step of construction of a first circular arc, from the initial position 710a and the initial heading for the re-joining, and oriented toward the waypoint 732a;

a step of construction of a second circular arc as far as the position of the waypoint 732a to be re-joined and the heading of the route segment 722a for which this waypoint is the initial waypoint, for example with the minimum turn radius of the aircraft, and oriented toward the initial position 710a;

a step of construction of a rectilinear segment tangential to the first and second circular arcs.

According to this method of calculating the trajectory, the first circular arc makes it possible for the aircraft to perform a turn towards the waypoint to be reached; the second circular arc makes it possible for the aircraft to perform a turn at the end of the forced re-joining trajectory in order to be aligned with the next route segment, in this case the final route segment.

This calculation method makes it possible to automatically propose a trajectory to a pilot, even if the first calculations of a re-joining trajectory have not worked. Furthermore, the trajectory obtained makes it possible for the aircraft to arrive at the FAF in alignment with the landing runway, and therefore to perform its final approach in satisfactory conditions.

FIG. 7b represents a second example of a forced re-joining 700b of a final waypoint of a route by an exemplary method according to one embodiment of the invention.

The route of the aircraft comprises the segments 720b, 721b, 722b and 723b, as well as the waypoints 730b, 731b, 732b and 733b, respectively equivalent to the route segments 720a, 721a, 722a, 730a, 731a, 732a and 733a of FIG. 7a. The route ends in a final approach comprising the segments 722b, 723b, the landing runway 740b and the FAF 732b. As in the preceding example, a method according to the invention has not been able to calculate and validate a re-joining trajectory for the segments 720b and 721b. A step of calculation of a re-joining trajectory for the FAF 732b, for example the step 430 of the method 400, is therefore activated.

In this example, the position 710b of the aircraft does not allow it to construct a trajectory similar to the trajectory 700a. Indeed, the minimum turn radius of the aircraft is too great to enable it to re-join the point 732b directly. In one embodiment of the invention, an alternative calculation method for calculating the forced re-joining trajectory can for example comprise the following steps:

a step of construction of a first circular arc, from the position 710a and the initial heading for the re-joining, and oriented in the direction opposite to the waypoint 732a;

a step of construction of a second circular arc, to the position of the waypoint 732a to be re-joined and the heading of the route segment 722a for which this waypoint is the initial waypoint, for example with the minimum turn radius of the aircraft, and oriented in the direction opposite to the initial position 710*a*;

a step of construction of a third circular arc, tangential to the preceding two, for example with the minimum turn radius of the aircraft.

This method of calculating a forced re-joining trajectory is particularly advantageous. Indeed, it makes it possible to automatically propose a forced re-joining trajectory for a final waypoint even if the turn radius of the aircraft is too great to calculate a direct forced re-joining trajectory.

Figure 8A:
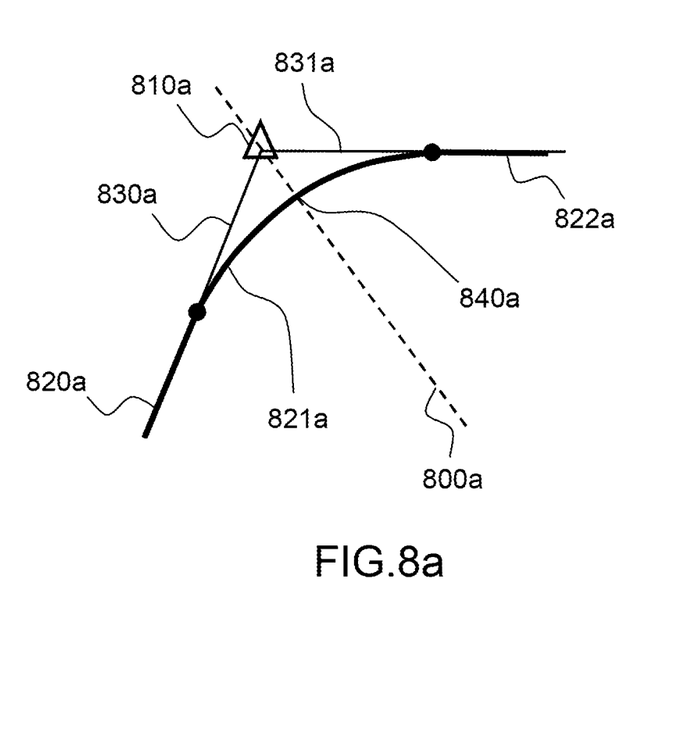
FIGS. 8a and 8b, two examples of construction of a sequencing plan from a waypoint by an exemplary method according to the invention.
Figure 8B:
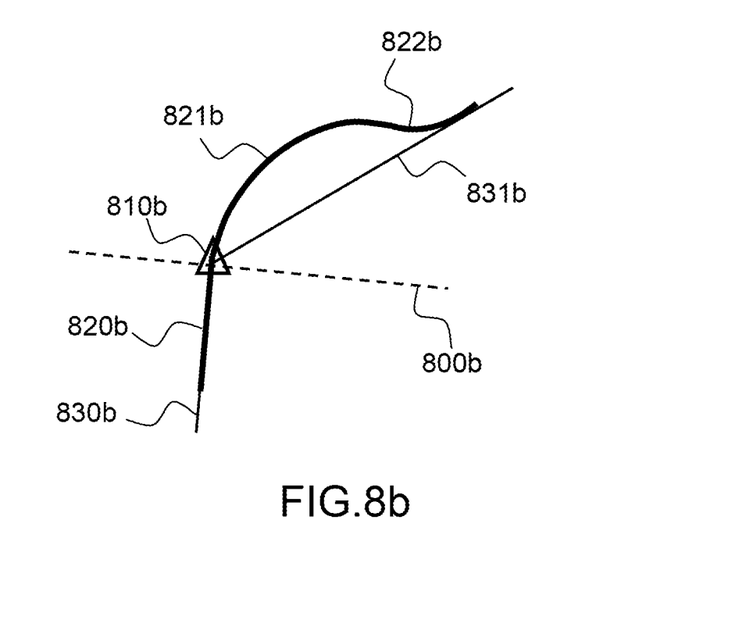

FIGS. 8*a* and 8*b* represent two examples of construction of a sequencing plane of a waypoint by an exemplary method according to the invention. These sequencing planes can be used to determine whether the trajectory is valid or has provoked the sequencing of the current waypoint.

FIG. 8*a* represents a sequencing plane 800*a* in the case of a waypoint 810*a* that the aircraft does not mandatorily have to fly over. The waypoint 810*a* is situated at the intersection of the route segments 830*a* and 831*a*. Since its over-flight is not mandatory, a trajectory constructed by the FMS to overfly this waypoint generally comprises a first rectilinear leg 820*a*, a curvilinear trajectory segment 821*a* and a second leg 822*a*.

In one embodiment of the invention, the sequencing plane 800*a* of a waypoint 810*a* that does not mandatorily have to be flown over is a vertical plane containing the bisector of the route segments 830*a* and 831*a* for which the waypoint is respectively end waypoint and initial waypoint. In the context of the flying of the trajectory, the waypoint is sequenced when the aircraft reaches the point 840*a* of intersection between the trajectory and the sequencing plane. In the context of the validation of a re-joining trajectory for the segment 830*a*, for example in the step 340 of a method according to the invention, the trajectory will for example be able to be validated if it does not cross the plane 800*a*, that is to say if it has no point closer to the segment 831*a* than the segment 800*a*.

FIG. 8*b* represents a sequencing plane 800*b* in the case of a waypoint 810*b* that must be flown over. The waypoint 810*b* is situated at the intersection of the route segments 830*b* and 831*b*. Since over-flight thereof is mandatory, a trajectory constructed by the FMS to fly over this waypoint can for example comprise a leg 820*b*, a first curvilinear segment 821*b* to perform a first turn towards the route segment 831*b*, and a second curvilinear segment 822*b* to approach this segment.

In one embodiment of the invention, the sequencing plane 800*b* of a waypoint 810*b* for which over-flight is mandatory, is a vertical plane comprising the perpendicular to the route segment 830*b* for which this waypoint 810*b* is the end waypoint, comprising said waypoint 810*b*. In the context of following a trajectory, the waypoint 810*b* is sequenced at the moment when the waypoint 810*b* is flown over. In the context of the validation of a re-joining trajectory for the segment 830*b*, for example in the step 340 of a method according to the invention, the trajectory can for example be validated if it does not cross the plane 800*b*.

The above examples demonstrate the capacity of the invention to permanently propose, when an aircraft deviates from a reference route, a re-joining trajectory for this route. They are however given purely as examples and in no way limit the scope of the invention, defined in the claims below.

The invention claimed is:

1. A computer-implemented method for automatically calculating, when executed by a computing device, a trajectory for re-joining an aircraft reference route, said method comprising a plurality of iterations, each iteration comprising at least:
   detecting a presence or absence of a deviation from an active segment of said route;
   if the presence of the deviation from the active segment of said route is detected:
      selecting a route segment to be re-joined;
      calculating a re-joining trajectory between a starting point and said route segment to be re-joined;
      determining a validation state of the re-joining trajectory for said route segment to be re-joined; and
   if the validation state is a valid state:
      assigning the re-joining trajectory for said route segment to be re-joined to the trajectory for re-joining an aircraft route;
   if the validation state is an invalid state:
      verifying an existence of a next route segment fulfilling a selection condition;
      if a next route segment fulfils said selection condition:
         selecting said next route segment as route segment to be re-joined; and
         returning to calculating of a re-joining trajectory for the route segment to be re-joined; and
      if no next route segment fulfils said selection condition, applying an exit procedure.

2. The method according to claim 1, comprising, prior to selecting a route segment to be re-joined, determining an initial point of the re-joining trajectory at least from a current position of the aircraft.

3. The method according to claim 2, wherein the position of the aircraft at the initial point of the trajectory is determined from a predicted state of the aircraft by maintaining a current guidance mode for a predefined duration.

4. The method according to claim 1, further comprising a step of initialization, consisting in disengaging a managed mode.

5. The method according to claim 1, wherein a condition of deviation from said route is verified when a distance between the aircraft and the route is greater than a predefined threshold.

6. The method according to claim 1, wherein a condition of deviation from said route is verified when an angular deviation between a true route of the aircraft and the route is greater than a predefined threshold.

7. The method according to claim 1, wherein the selecting a route segment to be re-joined selects the active segment when a condition of deviation from said route has been verified.

8. The method according to claim 1, wherein calculating a re-joining trajectory for said segment uses a predefined re-joining angle.

9. The method according to claim 1, wherein the re-joining trajectory for the segment is validated if said re-joining trajectory for the segment does not bear out a condition of sequencing from an end waypoint of the segment.

10. The method according to claim 9, wherein the condition of sequencing from the end waypoint of the segment is verified if the re-joining trajectory for the segment crosses a plane containing the end waypoint of the segment.

11. The method according to claim 10, wherein said plane is a vertical plane called a sequencing plane defined by:
  if the route of the aircraft does not include any obligation to overfly the end waypoint of the segment, a plane bisecting a horizontal angle between the segment to be re-joined and the next segment; and
  if the route of the aircraft includes an obligation to overfly the end waypoint of the segment, a plane at right angles to the active segment containing the end waypoint of said active segment.

12. The method according to claim 10, wherein:
  when the condition of sequencing from at least one end waypoint of a segment is borne out, the re-joining trajectory for the segment is saved until the point at which it crosses said plane containing the end waypoint of the segment; and
  a next step calculating a re-joining trajectory for a route segment is initialized using said saved trajectory.

13. The method according to claim 1, wherein applying an exit procedure comprises calculating a forced re-joining trajectory for a final waypoint.

14. The method according to claim 1, wherein the applying an exit procedure comprises raising an alert.

15. The method according to claim 1, wherein the last segment is the one for which an end waypoint is a final approach point.

16. A trajectory calculation system, comprising computation means configured to automatically perform a calculation of a re-joining trajectory for an aircraft route, said calculation comprising a plurality of iterations, each iteration comprising at least:
  detecting a presence or absence of a deviation from an active segment of said route;
  if the presence of the deviation from the active segment of said route is detected:
    selecting a route segment to be re-joined;
    calculating a re-joining trajectory between a starting point and said route segment to be re-joined; and
    determining a validation state of the re-joining trajectory for said route segment to be re-joined;
  if the validation state is a valid state:
    assigning the re-joining trajectory for said route segment to be re-joined to the trajectory for re-joining an aircraft route;
  if the validation state is an invalid state:
    verifying an existence of a next route segment fulfilling a selection condition;
  if a next route segment fulfils said selection condition:
    selecting said next route segment as route segment to be re-joined; and
    returning to calculating a re-joining trajectory for the route segment to be re-joined; and
  if no next route segment fulfils said selection condition:
    applying an exit procedure.

17. A non-transitory computer storage medium storing thereon a computer program, said computer program comprising computer-executable instructions adapted to be executed on a computer to implement a method for automatically calculating a re-joining trajectory for a route of an aircraft, said method comprising a plurality of iterations, each iteration comprising at least, for each iteration:
  detecting a presence or absence of a deviation from an active segment of said route;
  performing the following operations when the deviation from the active segment of said route is detected:
    selecting a route segment to be re-joined;
    calculating a re-joining trajectory between a starting point and said route segment to be re-joined; and
    determining a validation state of the re-joining trajectory for said route segment to be re-joined;
  if the validation state is a valid state:
    assigning the re-joining trajectory for said route segment to be re-joined to the trajectory for re-joining an aircraft route;
  if the validation state is an invalid state:
    verifying an existence of a next route segment fulfilling a selection condition;
  if a next route segment fulfils said selection condition:
    selecting said next route segment as route segment to be re-joined; and
    returning to calculating a re-joining trajectory for the route segment to be re-joined; and
  if no next route segment fulfils said selection condition:
    applying an exit procedure.

* * * * *